United States Patent [19]
Barth et al.

[11] Patent Number: 5,342,142
[45] Date of Patent: Aug. 30, 1994

[54] ANGULAR PAVING STONE FOR PAVING AREAS

[75] Inventors: Günther Barth, Bühlertal; Fritz von Langsdorff; Harald von Langsdorff, both of Rastatt, all of Fed. Rep. of Germany

[73] Assignee: F. von Langsdorff Licensing Limited, Mississauga, Canada

[21] Appl. No.: 768,300

[22] PCT Filed: Apr. 3, 1990

[86] PCT No.: PCT/EP90/00526
§ 371 Date: Dec. 3, 1992
§ 102(e) Date: Dec. 3, 1992

[87] PCT Pub. No.: WO90/12152
PCT Pub. Date: Oct. 18, 1990

[30] Foreign Application Priority Data
Apr. 4, 1989 [EP] European Pat. Off. ......... 89105898.4

[51] Int. Cl.⁵ ............................................. E01C 5/02
[52] U.S. Cl. ................................................ 404/41; 404/42
[58] Field of Search ................................ 404/41, 42

[56] References Cited
FOREIGN PATENT DOCUMENTS
2354600 5/1975 Fed. Rep. of Germany ........ 404/42
2407621 8/1975 Fed. Rep. of Germany ........ 404/42

Primary Examiner—William P. Neuder
Attorney, Agent, or Firm—Spencer, Frank & Schneider

[57] ABSTRACT

An angular paving stone (2) for paving areas, comprising two outer sides (16), two inner sides (18) and two face sides (20). At the five outer corners (4) of the angular paving stone (2) there are provided quarter recesses (22). At the center of the outer sides (16) of the angular paving stone (2) there are provided half recesses (24). At the inner corner (6) of the angular paving stone (2) there is provided a three-quarter recess (26). The partial recesses (22, 24, 26) supplement each other in the paved area so as to form full recesses (38) for water discharge.

10 Claims, 5 Drawing Sheets

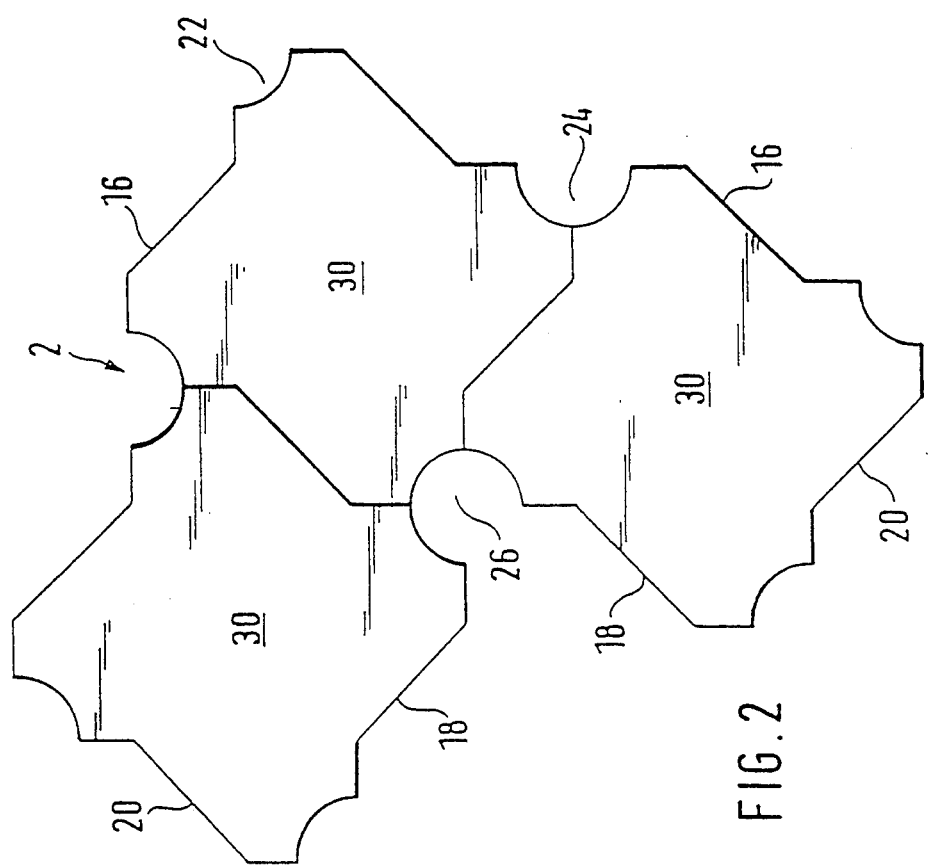
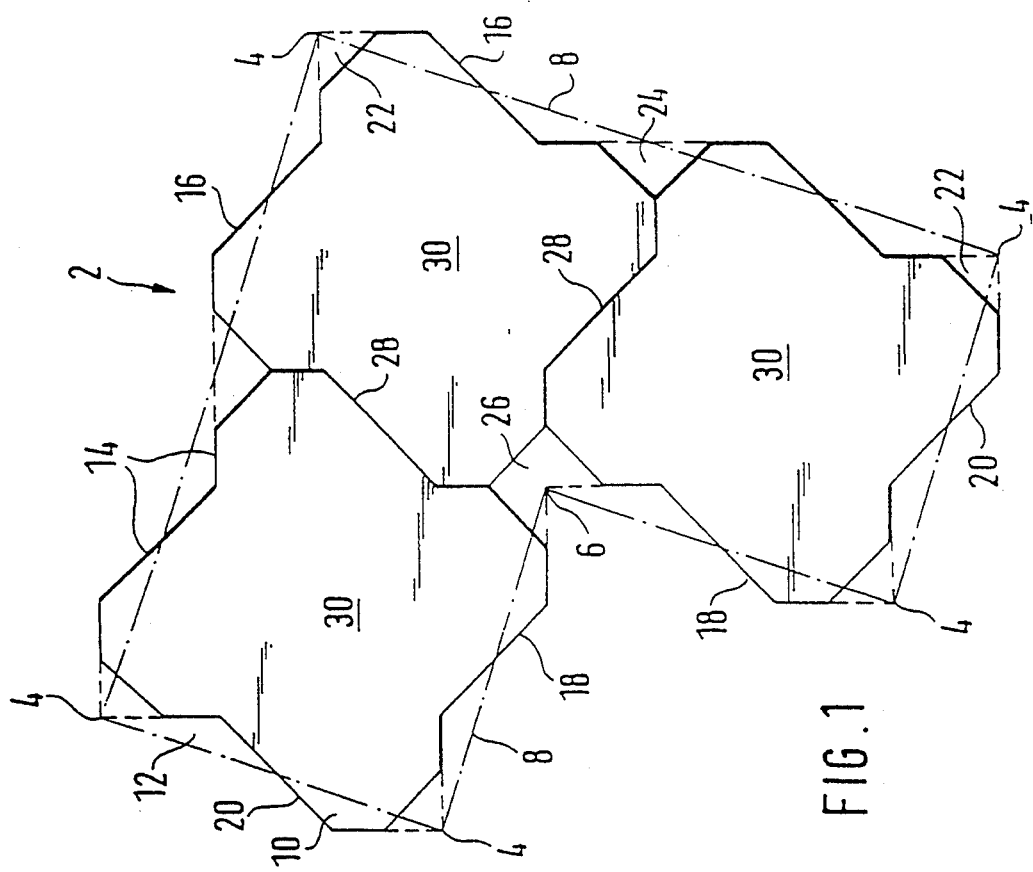

ANGULAR PAVING STONE FOR PAVING AREAS

The invention relates to an angular paving stone of solidifying material for paving areas, comprising two outer sides, two inner sides and two face sides.

Angular paving stones are known. They may be characterized to the effect that two stone legs extending at an angle with respect to each other are integrally united with each other at the location where the legs meet. Angular paving stones provide the advantage that, when laid in interlocking fashion, i.e. when a plurality of like angular paving stones are laid beside each other, a mutually interlocking arrangement of the angular paving stones results. This is advantageous for the carrying capacity of the paved area and when a group of angular paving stones arranged in composite or interlocking manner is grasped by a clamping gripper engaging laterally on the outside, and is laid in this manner as a group; in doing so, the risk is minimized that individual stones inadvertently fall down from the grasped group before the group is laid as a whole. However, it is to a certain degree disadvantageous with respect to angular paving stones that the joining region of the two stone legs is subject to comparatively high loads when lateral forces act on the free ends of the stone legs. Therefore, there is a tendency towards the risk that cracks starting from the inner corner, where the two inner sides meet, will be caused in case of excessive loads. In addition thereto, the known angular paving stones have the disadvantage that they allow water to seep away only to an insignificant extent—through the gaps between adjacent stones.

It is the object of the invention to make available an angular paving stone which renders possible a considerably increased discharge of water into the paved area than it would be possible through the gaps between angular paving stones laid adjacent each other, and which presents a broken-up, interesting, but nevertheless uniform and calm appearance when laid in interlocking fashion.

To meet this object, the angular paving stone according to the invention is characterized in that quarter recesses are provided at the five outer corners of the angular paving stone where the two outer sides meet and where outer sides meet face sides and inner sides meet face sides; that half recesses are provided at the center of the outer sides of the angular paving stone; and that a three-quarter recess is provided at the inner corner of the angular paving stone where the two inner sides meet; the quarter recesses, the half recesses and the three-quarter recess being provided such that, when like angular paving stones are laid adjacent thereto, full recesses are formed at all locations by mutual supplementation for discharging water into the layer located underneath.

With the angular paving stone according to the invention, the at first seemingly bold path was taken to weaken the stone by material removal due to the comparatively large three-quarter recess at the inner corner right in the joining region of the two stone legs. It surprisingly has turned out that this material removal has no negative effects on the strength of the angular paving stone. This is attributed to the fact that the critical inner corner point proper has been abandoned so that this concrete starting point for stone cracks is eliminated.

Configurations with equally long stone legs and/or with stone legs extending at right angles to each other are preferred for the angular paving stone according to the invention. Preferred, practical materials for the angular paving stone are cement- or plastics-setting concretes or brick materials. These materials have solidified when the angular paving stone is ready for being laid. The angular paving stone preferably can be laid in a plurality of laying patterns, as will be shown by the embodiments hereinafter, and results, with an arbitrary laying pattern selected, in the desired supplementation of the quarter recesses, half recesses and three-quarter recesses so as to form full recesses. The angular paving stone preferably does not have holes or openings in the interior of the stone; the improved water discharge into the layer underneath is to take place through the full recesses. The quarter recesses, half recesses and three-quarter recesses are located at the edge of the angular paving stone and can be made there with less problems than openings in the interior of the stone.

The angular paving stone preferably serves for being laid on, or paving, outdoor areas. Preferred fields of use to be mentioned are roads, yards, footpaths, industrial areas, squares, garage drives and the like.

In the paved area, the full recesses can be filled with a suitable filling material—for instance sand, fine gravel, fine chips, ashes, or the like—preferably to a level of the angular paving stone top sides or slightly below.

It is preferred when the general extent of the length of each outer side of the angular paving stone is twice that of the general extent of the length of each inner side thereof and of each face side thereof. This provides an angular paving stone having balanced proportions and a particularly great variety of possible laying patterns.

The angular paving stone preferably is designed as an interlocking paving stone having protrusions and retractions on all sides for interlocking engagement with like angular paving stones placed thereagainst. The protrusions and retractions become most evident when viewed in comparison with the basic configuration of the angular paving stone, in which the five outer corner points and the inner corner point—which are cut away by the quarter recesses, half recesses and three-quarter recesses—are connected to each other by straight connecting lines. For instance, when two identical angular paving stones are placed adjacent an outer side of the angular paving stone having protrusions and retractions, the latter paving stone interlocks the two neighboring stones with each other in positive manner. This provides a particularly high loading capacity of the paved area and a particularly good coherence of an actually loose group of angular paving stones when laid in common by means of a clamping gripper. As regards the concrete geometric design of the paths of the protrusions and retractions, there is a large variety of possibilities, with some preferred ones thereof being shown hereinafter in the embodiments. Serrated or corrugated paths or patterns are preferred in general. Regular paths as a rule yield the optically most pleasing angular paving stone configurations.

An especially preferred angular paving stone configuration is characterized in that—when the quarter recesses, the half recesses and the three-quarter recesses are conceived of as being closed—each outer side consists of two identical outer side halves, each inner side corresponds to an outer side half and is parallel thereto, and each face side corresponds to an inner side and—generally speaking—is disposed at right angles to the adjacent inner side and the adjacent outer side. This design can be realized both with rectilinear outer sides, inner sides and face sides and with stones sides having protrusions and restrictions.

A particularly preferred embodiment of the invention is characterized in that the quarter recesses, the half recesses and the three-quarter recess each have provided thereon a marginal strip piece or section that is set off with respect to the top side o the angular paving stone, so that the full recesses are surrounded by a set off marginal strip. The marginal strip pieces may have downward slopes in the direction towards the recesses, and in particular they may extend downwardly to the recesses in the form of inclined areas or in funnel-like manner. The set off of the marginal strip pieces with respect to the angular paving stone top side can be provided by the downward slope or in particular also by a step-like lower placement thereof or a combination of both thereof. Marginal strips with a downward slope direct water from above in funnel-like manner into the full recesses. In particular in case of marginal strips surrounding the full recesses and having a downward slope towards the recesses, for instance earthy contaminations of the top sides of the "filling material plugs" can be swept away comparatively easily, also with motor sweepers, since the sweeping brushes meet abutment areas at the edges of the full recesses. The result is an area paving which can be regenerated and as a whole allows the passage of water and in which contaminations in the upper region of the "filling material plugs", which possibly have a clogging effect, can be removed without any problem.

It is pointed out that the measures described in the preceding paragraph may be realized according to the invention also with stones of cement-setting material for paving areas, which otherwise do not have the features indicated in claim 1. Concretely speaking, such stones may be stones which do not have an angular configuration and/or which have partial recesses which supplement each other so as to form full recesses but which are not necessarily as well quarter recesses at the outer corners, half recesses at the center of the outer sides and a three-quarter recess at the inner corner.

The top side of the angular paving stone preferably is subdivided by two dummy gaps into three optically alike top side portions. The result hereof is that the angular paving stone orientation in the paved area is practically not visible any more. An analogous result is achieved when—as is preferred as well—three mutually alike raised portions are provided on the top side of the angular paving stone.

According to a particularly preferred embodiment, the top side of the angular paving stone is provided with dummy gaps terminating in the half-recesses and the three-quarter recess or terminating in the corresponding marginal strip pieces. The result thereof is a particularly efficient water discharge to the "dummy gap connected" full recesses. It is expressly pointed out that the measure of the "dummy gap connection" of partial recesses or the marginal strip pieces thereof in case of stones of cement-setting material for paving areas is also technically sensible per se, i.e. without simultaneous realization of the features indicated in claim 1, and thus can be realized per se.

Preferably, the full recesses between the angular paving stones are of square or round configuration as seen in a top plan view.

The considerably increased water discharge, rendered possible according to the invention, into the paved area through the full recesses presenting a clearly increased overall water discharge cross-sectional area than the gaps between the laid stones, has the effect that paved areas no longer need to be connected to a drain system. Due to this fact and by savings in drainage and sewage systems, considerable costs are saved. Rather, water from above, in particular rain water, is passed into the underground, and this contributes in keeping the ground water level in desired manner as high as possible. Plants growing nearby receive sufficient water. Besides, even in case of heavy rainfall, there is not water accumulated on the paved area, since the water is discharged into the underground at many distributed locations. When dummy gaps and/or recessed portions are present between raised portions, particularly rapid dewatering and drying of the paved area is achieved.

Finally, it is pointed out that the full recesses may also be closed partially by means of plugs, e.g. of plastics material, provided with water discharge channels.

The invention and further developments of the invention will now be elucidated in more detail on the basis of preferred embodiments shown in the drawings, in which FIG. 1 shows a first embodiment of an angular paving stone having partial recesses;

FIG. 2 shows a second embodiment of an angular paving stone having partial recesses;

Figure 6:
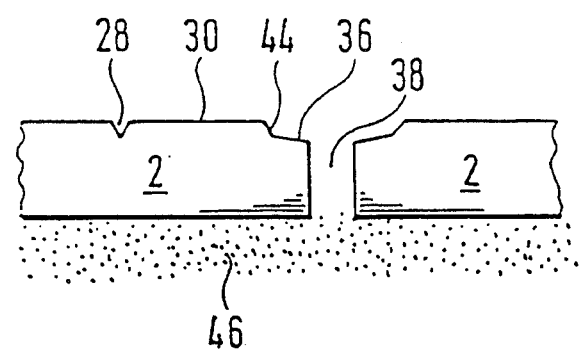
FIG. 6 shows a vertical sectional view along the line VI—VI in FIG. 5.

All drawing figures with the exception of FIG. 6 show the paving stones or the paved area, respectively, in top plan views.

The angular paving stone 2 shown in FIG. 1 has five outer corner points 4 and one inner corner point 6. When making straight connection lines 8 between these corner points 4, 6, one arrives at the basic configuration of the angular paving stone 2. This basic configuration can be characterized in that two stone legs of equal length and extending at right angles to each other are united with each other along a joining region extending obliquely at an angle of 45° and leading from the inner corner point 6 to the opposing outer corner point 4.

The angular paving stone sides follow a path which—when the partial recesses described hereinbelow are disregarded for the time being—extends back and forth with respect to the connection lines 8 so as to form protrusions 10 and retractions 12. The path of the stone sides with said protrusions 10 and retractions 12 as defined by rectilinear side sections 14 extending in angular manner with respect to the connection lines 8, with part of the side sections 14 including a larger angle with the connection lines 8 and the remainder of the side sections including a smaller angle with the connection lines 8. In this manner, there are formed two outer sides 16 which generally speaking extend at right angles to each other, two inner sides 18 which generally speaking extend at right angles to each other, and two face sides 20 which generally speaking extend at right angles both to the adjacent outer side 16 and the adjacent inner side 18.

At the five outer corner points 4, where the two outer sides 16 meet or where an outer side 16 and a face side 20 meet or where a face side 20 and an inner side 18 meet, there is provided one triangular quarter recess 22 each. Or in other words: the outer corner point proper is obliquely cut away there. At the inner corner point 6, where the two inner sides 18 meet, there is provided a three-quarter recess 26 which has the configuration of a square with one triangle sector missing. Or in other words: a material portion is cut away there from the paving stone 2, which is confined by three sides of a square. In the middle portion of each outer side 16 there is provided a half recess 24 having the shape of a triangle. Or in other words: a material portion is cut away there from the paving stone 2 which is defined by two sides of a triangle. The half recesses 24 each have twice the area as the quarter recesses 22, and the three-quarter recess 26 has thrice the area of a quarter recess 22.

Moreover, it is possible to see two dummy gaps 28 in FIG. 1 which each extend from the three-quarter recess 26 to the opposite half recess 24. Due to the dummy gaps 28, the top side of the angular paving stone is optically subdivided into three equal top side portions. As seen in a vertical sectional view, the dummy gaps for instance are substantially of triangular or inversely trapezoidal configuration. They have a depth of several millimeters.

At the transition from the top side of the paving stone to the vertical paving stone sides, a small bezel is preferably provided everywhere, which is not shown in the drawing for reasons of clarity.

When the partial recesses 22, 24, 26 described are imagined as being closed or not present, the outer sides 16 each consist of two identical halves placed against each other, each inner side 18 extends parallel and corresponds to the opposite outer side half, and each face side 20 corresponds to an adjacent inner side 18 or to an adjacent outer side half, however rotated through 90°. The dummy gaps 28 each extend parallel to an associated face side 20.

When several ones of the angular paving stones 2 shown in FIG. 1 are laid adjacent each other in one of several possible laying patterns, the quarter recesses 22, half recesses 24 and three-quarter recesses 26 at all locations on the paved area supplement or complement each other so as to form square full recesses of equal size at all locations. Thus, a picture of the paved area is formed which is determined by a regular alternation of top side portions 30 and full recesses and thus has an appearance which presents on the one hand a broken-up and interesting, but on the other hand a uniform and calm effect.

The angular paving stone 2 according to FIG. 2 differs from the angular paving stone 2 according to FIG. 1 merely in the configuration of the partial recesses 22, 24, 26. The quarter recesses 22 have the shape of a quarter circle, the half recesses 24 have the shape of a half circle, and the three-quarter recess 26 has the shape of a three-quarter circle.

Figure 3:
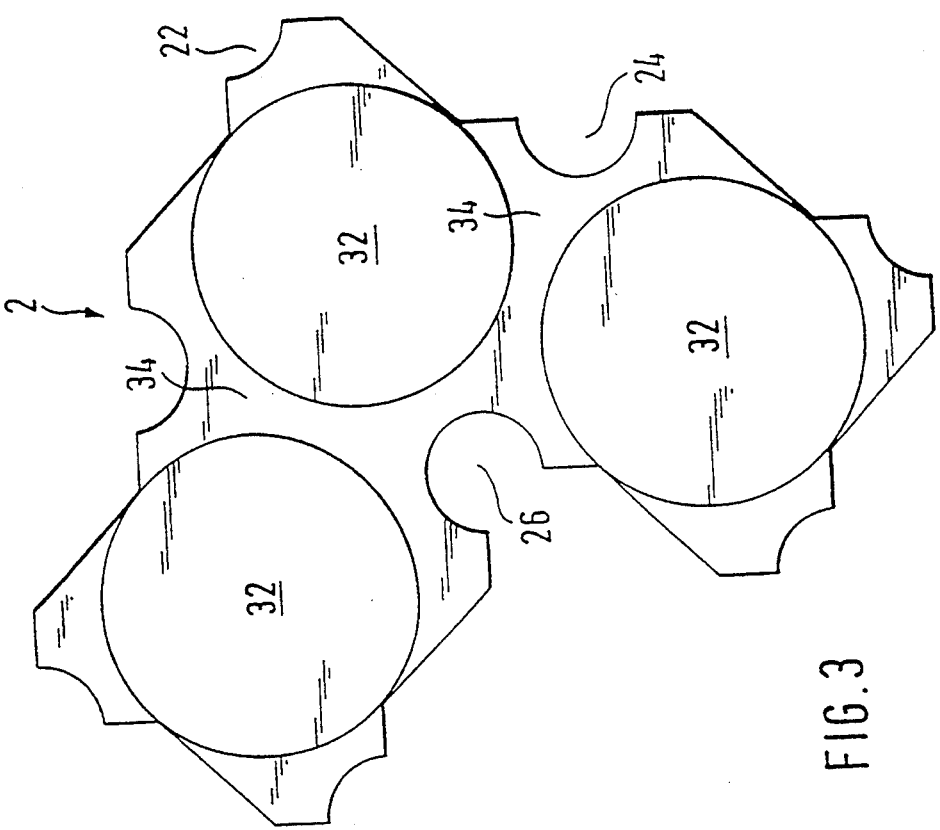
FIG. 3 shows a third embodiment of an angular paving stone having partial recesses and raised portions.

The angular paving stone 2 according to FIG. 3 differs from the angular paving stone 2 according to FIG. 2 merely in that no dummy gaps 28 are provided, whereas three equal circular raised portions 32 are provided in evenly distributed manner on the top side of the paving stone. Between the raised portions 32 there are provided channel-and face-like portions 34 which are located at a lower level and through which water can flow to the recesses.

Figure 4:
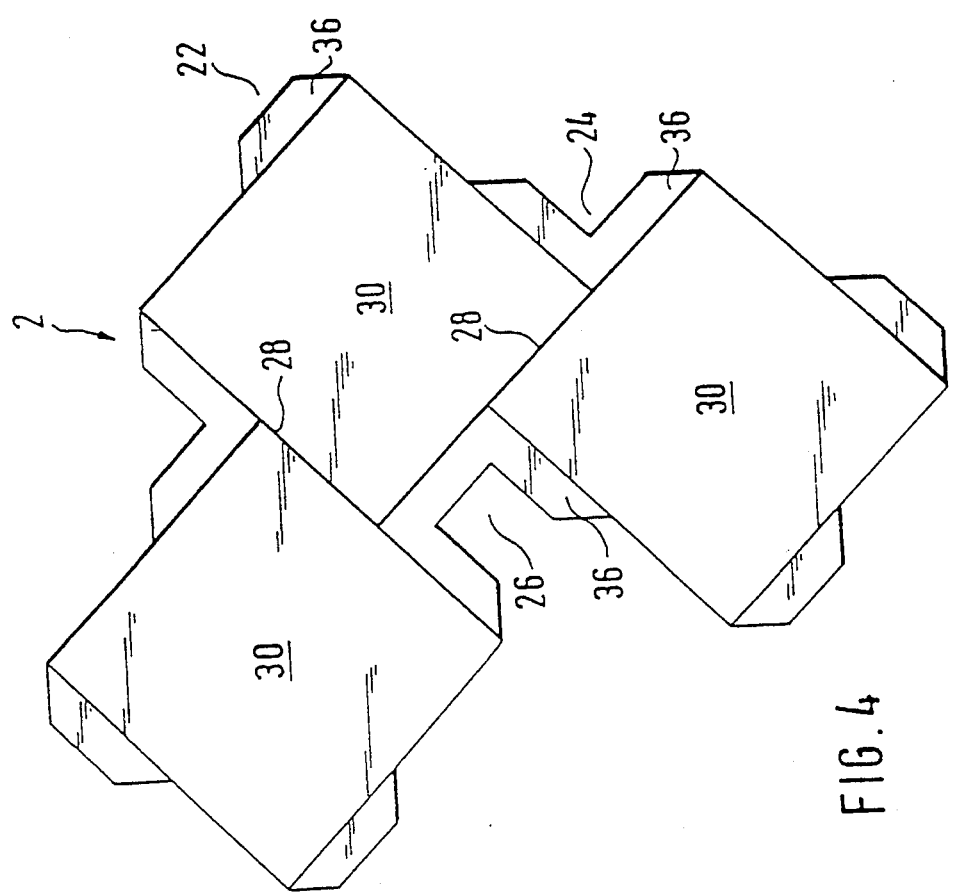
FIG. 4 shows a fourth embodiment of an angular paving stone having partial recesses and marginal strip pieces.

The angular paving stone 2 according to FIG. 4 differs from the angular paving stone 2 according to FIG. 1 by shorter, rectilinear dummy gaps 28 and marginal strip pieces 36 at the partial recesses 22, 24, 26. The marginal strip pieces 36 either have a horizontal top side and are placed at a lower level in step-like manner with respect to the remainder of the paving stone top side. Or the marginal strip pieces 36 have a downward slope of even area in the direction towards the particular partial recess 22, 24, 26. Or a combination of both of these measures is provided. The marginal strip pieces 36 extend along the partial recess edges with a uniform width, with the ends thereof being each terminated in oblique manner. In view of the marginal strip pieces 36, only the rectilinear central portion of the dummy gaps 28 has been left. The dummy gaps 28 terminate in the marginal strip pieces 36.

Figure 5:
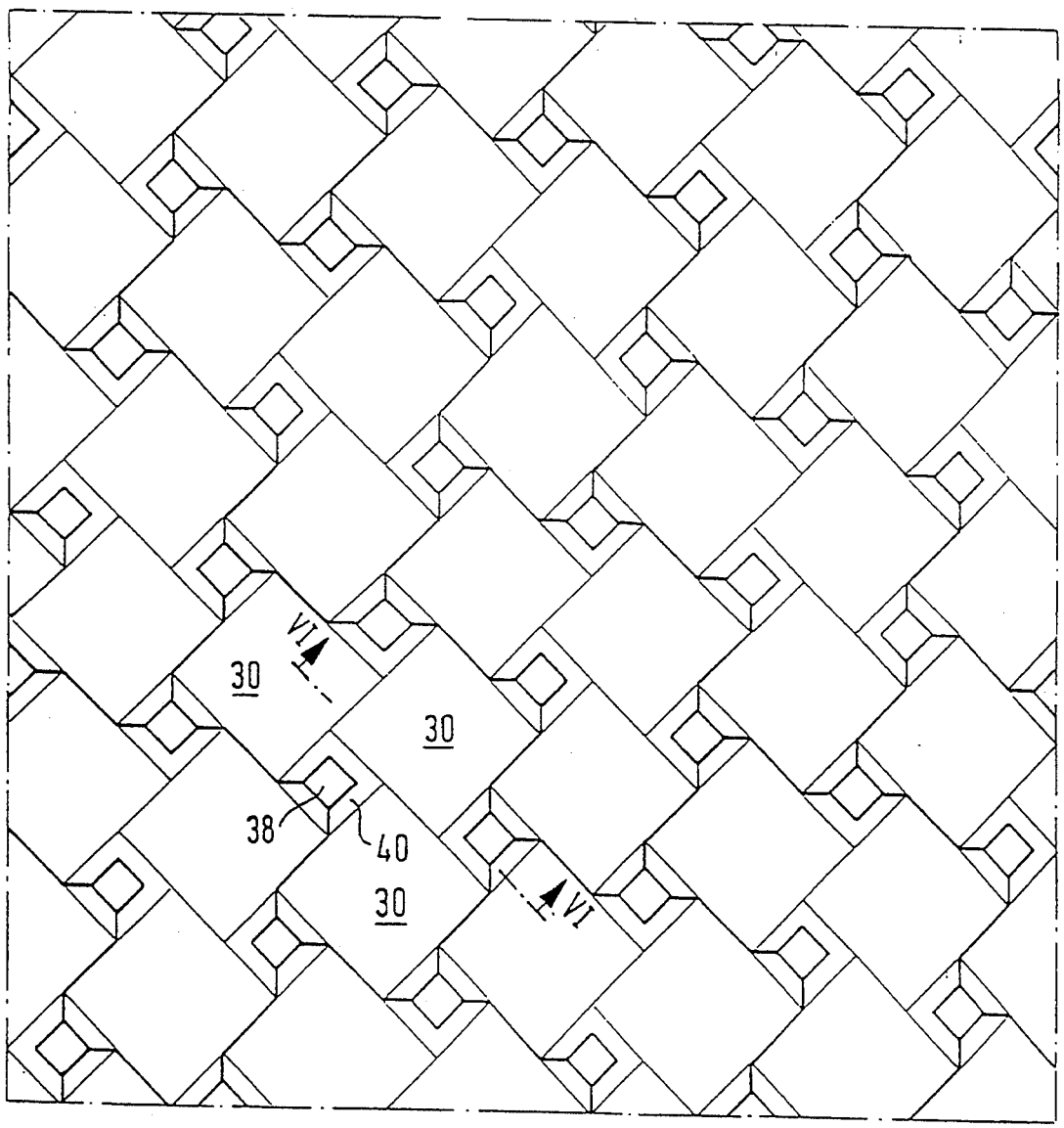
FIG. 5 shows a fragment of an area paved with angular paving stones according to FIG. 4.

FIG. 5 illustrates the appearance of an area paved with the angular paving stones 2 according to FIG. 4. It is possible to recognize the regular alternation of square top side portions 30 and square full recesses 38 which are each surrounded in square manner by a set off marginal strip 40. The surrounding marginal strips 40 are composed of quarter marginal strip pieces, half marginal strip pieces and three-quarter marginal strip pieces.

One can see in the vertical sectional view of FIG. 6 that the dummy gaps 28, as seen in section, substantially have the configuration of a somewhat rounded triangle standing on its tip, and that the angular paving stone top side has a small bezel 44 which extends all around the latter and has the same depth as the dummy gap 28. The marginal strip piece 36 shown in the drawing extends in roof-like manner obliquely downwardly to the full recess 38 and joins the lower end of the portion of the bezel 44 located there. The angular paving stones 2 are laid on a sub-layer 46 of sand or the like.

Figure 7:
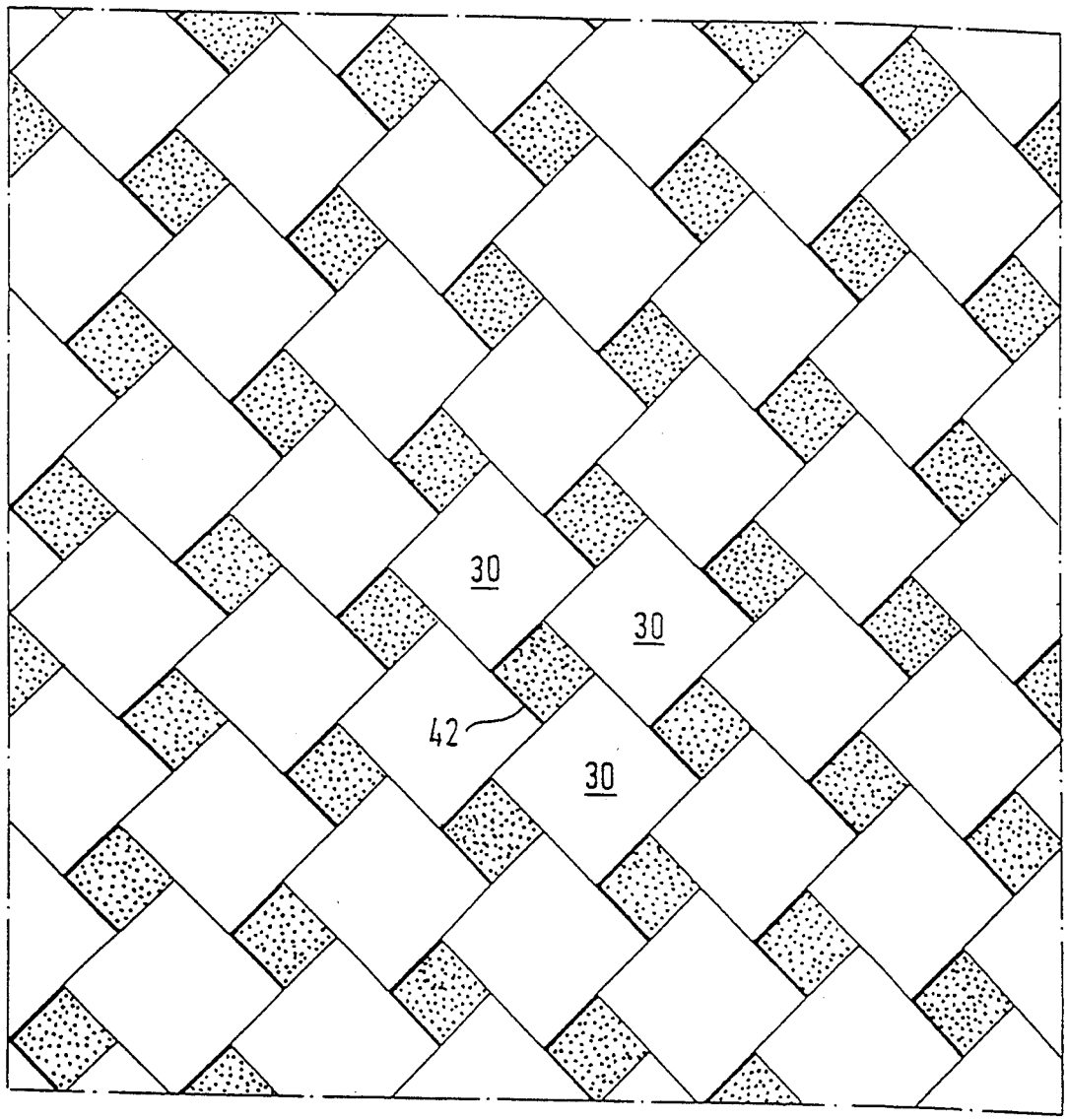
FIG. 7 shows the fragment of the area according to FIG. 5, however with the full recesses being filled.

FIG. 7 illustrates the appearance of the paved area after the full recesses 38 have been filled with a suitable filling material 42. As shown, the filling material 42 may cover the top sides of the marginal strips 40 with a thin layer thickness, but this is not necessarily so. In the first-mentioned case, the paved area present the appearance of a regular alternation between raised portions 30 of larger square area and portions with filling material 42 of smaller square area.

All embodiments shown in the drawings had stones sides with a zig-zag like path of protrusions/retractions. Instead of this, it is also possible to choose other paths of the stone sides, for instance a substantially corrugated path. The same applies in corresponding manner to the dummy gaps 28.

Figure 8:
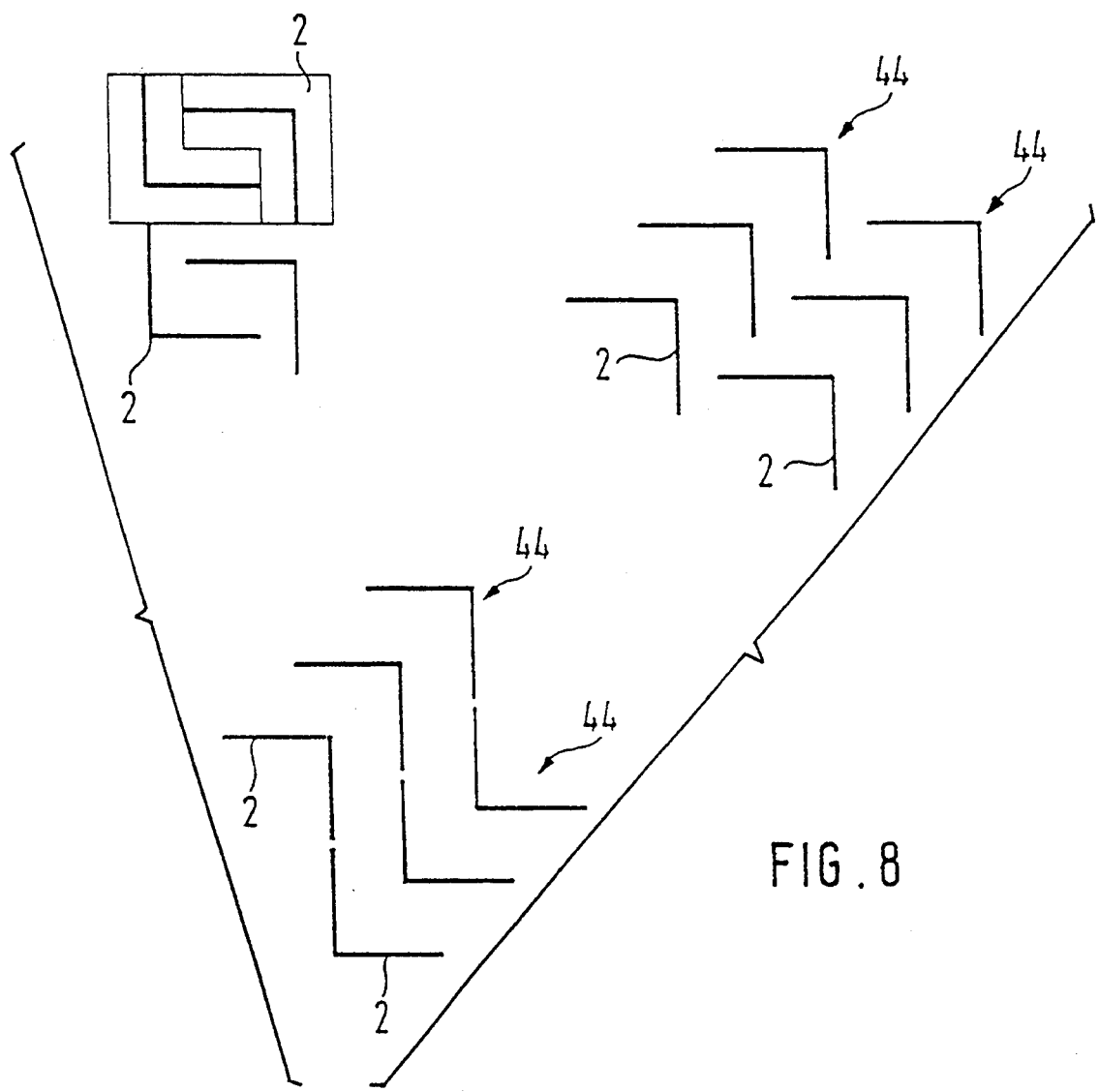
FIG. 8 shows a schematic view of several possible laying patterns of angular paving stones.

FIG. 8 shows several possibilities of laying angular paving stones 2 according to the invention in interlocking fashion or in the laying pattern, respectively, with each angular paving stone 2 being shown merely by an angled line. FIG. 8 at the top shows a variant in which two angular paving stones 2 each are placed against each other in opposite orientation so that they form a rectangular paving piece. FIG. 8 in the middle shows a variant in which the individual angular paving stones are arranged in rows 44 in the same orientation; within each row 44 the inner corner 6 of an angular paving stone is placed against that outer corner 4 of an adjacent angular paving stone 2 where the two outer sides 16 meet. The variant shown in FIG. 8 at the bottom differs therefrom merely in that the rows 44 are alternatingly arranged in opposite orientations. The laying pattern shown in FIG. 5 corresponds to the variant shown in FIG. 8 in the middle, as can be seen from the marginal strip pieces 36. In all of the possible laying patterns—which are more than those shown in FIG. 8—there is created a mutual supplementation of the quarter recesses 22, half recesses 24 and three-quarter recesses 26 so as to form full recesses 38.

We claim:

1. An angular paving stone (2) of solidifying material for paving areas, comprising two outer sides (16), two inner sides (18) and two face sides (20),
    characterized in that quarter recesses (22) are provided at the five outer corners (4) of the angular paving stone (2) where the two outer sides (16) meet and outer sides (16) meet face sides (20) and inner sides (18) meet face sides (20);
    that half recesses (24) are provided at the center of the outer sides (16) of the angular paving stone (2);
    and in that a three-quarter recess (26) is provided at the inner corner (6) of the angular paving stone (2) where the two inner sides (18) meet;
    the quarter recesses (22), the half recesses (24) and the three-quarter recess (26) being provided such that, when like angular paving stones (2) are laid adjacent thereto, full recesses (38) are formed at all locations by mutual supplementation for discharging water into the layer located underneath.

2. An angular paving stone (2) according to claim 1, characterized in that the general extent of the length of each outer side is twice that of the general extent of he length of each inner side (18) and of each face side (20).

3. An angular paving stone (2) according to claim 1, characterized in that it is designed as an interlocking paving stone having protrusions (10) and retractions (12) on all sides for interlocking engagement with like angular paving stones (2) placed thereagainst.

4. An angular paving stone (2) according to claim 3, characterized in that—when the quarter recesses (22), the half recesses (24) and the three-quarter recess (26) are conceived of as being closed—each outer side (16) consists of two identical outer side halves, each inner side (18) corresponds to an outer side half and is parallel thereto, and each face side (20) corresponds to an inner side (18) and—generally speaking—is disposed at right angles to the adjacent inner side (18) and the adjacent outer side (16).

5. An angular paving stone (2) according to claim 1, characterized in that the quarter recesses (22), the half recesses (24) and the three-quarter recess (26) each have provided thereon a marginal strip piece (36) that is set off with respect to the top side of the angular paving stone, so that the full recesses (38) are surrounded by a set off marginal strip (40).

6. An angular paving stone (2) according to claim 5, characterized in that the marginal strip pieces (36) have downward slopes in the direction towards the recesses (22; 24; 26; 38).

7. An angular paving stone (2) according to claim 1, characterized in that the top side of the angular paving stone (2) is subdivided by two dummy gaps (28) into three optically alike top side portions (30).

8. An angular paving stone (2) according to claim 1, characterized in that three mutually alike raised portions (32) are provided on the top side of the angular paving stone (2).

9. An angular paving stone (2) according to claim 1, characterized in that the top side of the angular paving stone (2) is provided with dummy gaps (28) terminating in the half recesses (24) and the three-quarter recess (26) or terminating in the corresponding marginal strip pieces (36).

10. An angular paving stone (2) according to claim 1, characterized in that the full recess (38) is of square or round configuration.

* * * * *